United States Patent [19]
Heller

[11] 3,742,616
[45] July 3, 1973

[54] EDUCATIONAL DEVICE

[76] Inventor: Aaron Heller, 23 West 68 Street, New York, N.Y. 10023

[22] Filed: May 8, 1972

[21] Appl. No.: 251,374

[52] U.S. Cl. .................................... 35/8 R, 35/58
[51] Int. Cl. .......................................... G09b 1/06
[58] Field of Search .................. 35/8 R, 9 D, 22 R, 35/22 A, 58, 73

[56] References Cited
UNITED STATES PATENTS

| | | | |
|---|---|---|---|
| 2,291,104 | 7/1942 | Radzyner | 35/22 R |
| 2,872,741 | 2/1959 | Krueger et al. | 35/9 D |
| 3,303,580 | 2/1967 | Stinar | 35/9 E |
| 3,343,279 | 9/1967 | Elkins | 35/58 X |
| 3,389,479 | 6/1968 | Gross | 35/9 D |
| 3,417,490 | 12/1968 | Chuy et al. | 35/9 H |
| 3,564,734 | 2/1971 | Abraham | 35/58 X |

Primary Examiner—Wm. H. Grieb
Attorney—Myron Cohen et al.

[57] ABSTRACT

An educational device comprising a box having a mirror surface therein disposed at a predetermined angle and a viewing surface disposed above the angled mirror surface and containing two pairs of adjacent slots therein with one pair of slots being disposed in a row and being angled substantially parallel to the mirror surface while the other pair of slots are disposed in an adjacent row substantially parallel thereto. The slots are also disposed in columns so that one slot comprises a viewing slot and the corresponding slot in the other row comprises a display slot. Means, such as cubes having indicia on each face thereof are removably mountable in the display slots for providing a pair of visible adjacent images at the viewing slots.

7 Claims, 4 Drawing Figures

PATENTED JUL 3 1973 3,742,616

EDUCATIONAL DEVICE

BACKGROUND OF INVENTION

1. Field of the Invention

The present invention relates to educational game devices such as of the type for teaching relationships between a plurality of indicia.

2. Description of the Prior Art

Prior art educational devices, such as of the type utilized for teaching side-by-side matching of pairs of objects are well known. For example, U.S. Pat. No. 2,872,741 discloses such a prior art device utilizing a pair of elements for completing an electrical circuit when the proper match is achieved by the insertion of the proper elements into the circuit board. Another such device is disclosed in U.S. Pat. No. 3,389,479. Such devices, however, require the use of electrical power to operate and are not economical in that batteries when they are utilized as a source of electrical power may have a relatively short life when the educational device is exposed to continuous use and testing. In addition, these devices may become inoperable if any one of the many electrical contacts becomes accidentally broken, such as through jarring during the continuous handling that such devices are normally exposed to. Other prior art educational aids for teaching the concept of pairs of related elements, such as by side-by-side matching, have utilized printed rolls of tapes which are rotated into position until the desired match is achieved. Such a device is disclosed in U.S. Pat. No. 3,303,580. However, such prior art devices are limited in the number of matches or relationships which may be taught by the length of the tapes. Furthermore, a device of the type disclosed in U.S. Pat. No. 3,303,580 requires considerable mechanical gearing to accomplish proper movement of the tape which adds cost to the manufacture thereof. These disadvantages of the prior art are overcome by the present invention.

SUMMARY OF THE INVENTION

An educational device, such as for teaching relationships between a plurality of indicia, includes a housing having a viewing surface, the viewing surface having a first pair of adjacent apertures or slots therein disposed in a first row and a second pair of adjacent apertures or slots therein disposed in a second row which is substantially parallel to the first row. The first and second rows are preferably substantially adjacent, one aperture of the first pair of apertures being adjacent to one aperture of the second pair of apertures in a first column and the other aperture of the first pair of apertures being adjacent to the other aperture of the second pair of apertures in a second column. A substantially planar mirror surface is preferably disposed below the first pair of apertures, which are termed the display slots, at a predetermined angle relative to the first pair of apertures. The second pair of apertures, which are termed the viewing slots, are disposed in the viewing surface preferably at an angle substantially equivalent to the mirror surface predetermined angle. Means, such as cubes having indicia on each face thereof, are removably mountable in the second pair of apertures for providing a pair of visible adjacent images at the first pair of apertures, the angle of reflection of the images with respect to the mirror surface enabling the incident images through the second pair of apertures to be visible through the first pair of apertures. Preferably, the indicia on one of the cube members have a predetermined relationship with respect to a corresponding indicia on the other of the cube members, each face thereof having different indicia thereon. In utilizing the present invention, a cube is selected and the desired indicia to be "matched" is placed face down in one display slot. The viewer then observes the image being displayed and selects another cube and places it in the other adjacent display slot with the face thereof bearing the appropriate desired relationship face down in this display slot. The viewer than can observe if he has selected the proper relationship by looking through the viewing slots at the adjacent images displayed therethrough.

DETAILED DESCRIPTION OF THE PREFERRED EMBODIMENT

Figure 1:
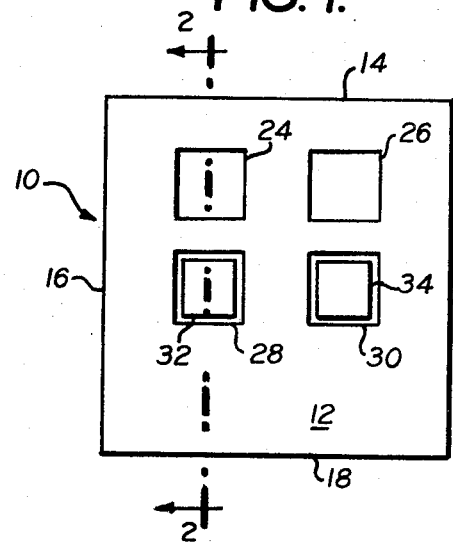
FIG. 1 is a plan view of the preferred embodiment of the present invention.
Figure 2:
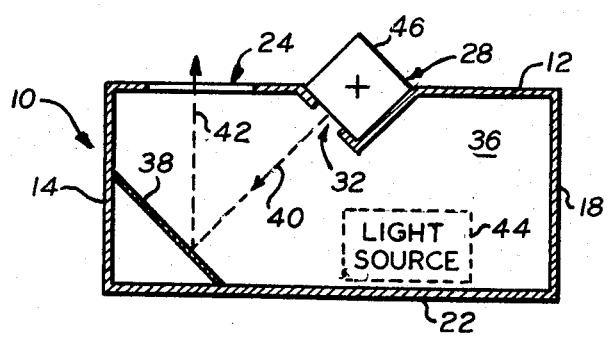
FIG. 2 is a sectional view, partly diagrammatic, taken along line 2—2 of FIG. 1.

Referring now to the figures in detail and especially to FIGS. 1 and 2 thereof, the present invention preferably includes a housing generally referred to by the reference numeral 10 which, as shown and preferred, is a hollow box-like enclosure although, if desired, other arrangements may occur to one of ordinary skill in the art. The housing 10 preferably includes a viewing surface 12, peripheral surrounding side walls 14, 16, 18 and 20, and a bottom or rear surface 22.

As shown and preferred, the viewing surface 12 preferably contains a pair of apertures 24 and 26 which are adjacent to each other and are disposed in a row. As will be explained in greater detail hereinafter, these apertures 24 and 26 are termed viewing slots. In addition, a second pair of apertures 28 and 30 are preferably disposed in a second row which is preferably substantially parallel to the row containing the viewing slots 24 and 26. For purposes of explanation and as will be explained in greater detail hereinafter, apertures 28 and 30 are termed the display slots. As shown and preferred in FIG. 1, one viewing slot 24 of the pair 24–26 and one display slot 28 of the pair 28–30 are arranged in a column as is the other viewing slot 26 and the other display slot 30. Display slots 28 and 30 preferably have an interior slot or aperture 32 and 34, respectively, therein which is disposed at a predetermined angle as will be explained in greater detail hereinafter.

Now referring to FIG. 2 which is a sectional view of the interior of the box 10 taken through slots 24 and 28. As shown and preferred in FIG. 2, the interior 36 of the box 10 preferably includes a planar mirror surface 38 disposed at a predetermined angle with respect to viewing slot 24 and the display slot interior slot 32. Most preferably, the display slot interior slot 32 and the planar mirror surface 38 are substantially parallel to each other and mirror surface 38 is angularly disposed so that the angle of reflection of the images being presented at display slot 32 with respect to the mirror surface 38 enables the incident image through display slot 32 to be visible through the corresponding viewing slot 24, this relationship being shown illustratively by dotted line 40 for the incident image and dotted line 42 for the reflected image. Preferably, an identical relationship exists between display slot 34 and viewing slot 26.

As is also shown in FIG. 2 by way of example, if desired, a conventional light source 44 may be contained within the interior 36 of the box 10 for illuminating the mirror surface 38.

Figure 3:
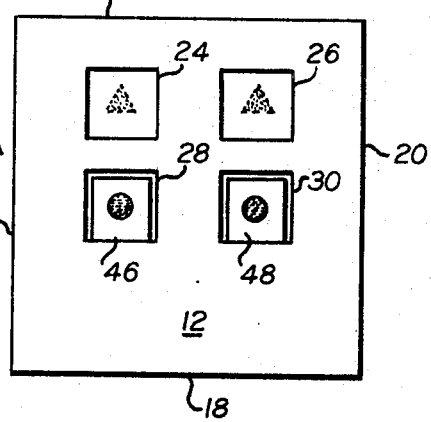
FIG. 3 is a plan view similar to FIG. 1 with a pair of cubes mounted in the display slots.
Figure 4:
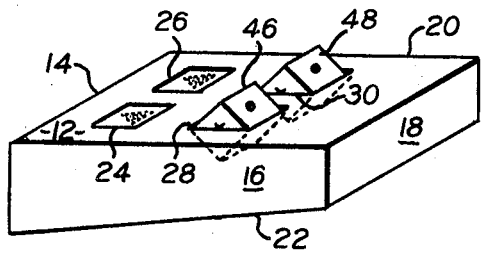
FIG. 4 is a perspective view of the arrangement shown in FIG. 3.

As shown and preferred in FIGS. 2 through 4, the indicia to be displayed is preferably contained on the faces of multifaceted members such as cubes 46, 48, two such cubes being shown by way of example.

In utilizing the present invention, the face of the appropriate cube, such as cube 46, containing the indicia desired to be displayed is placed face down in one of the displayed slots, such as display slot 32. This image is thereby reflected from mirror surface 38 through the corresponding viewing slot 24. The viewer then selects the proper face on the other cube 48 which contains the desired relationship, for example a match of identical elements as illustrated in FIG. 3, and places it face down in the other display slot 34. This image will be reflected from mirror surface 38 through viewing slot 26. The viewer then observes the two adjacent images contained in viewing slots 24 and 26 to see if the desired relationship has been established. Of course, any other desired relationship can also be taught such as opposites or large and small, etc. Preferably, in order to increase the challenge to the user of the device, a plurality of cubes in excess of two is provided so that the user must select the proper cube surface from a greater number of possible choices. In addition, if desired, more than two viewing and two display slots can be provided if it is desired to teach the relationship between a greater number of elements than two; however, a viewing slot should preferably always have a corresponding display slot associated therewith.

By utilizing the present invention the concept of a side-by-side match of a plurality of separate selectable indicia may easily be taught in an economical and efficient manner.

It is to be understood that the above described embodiment of the invention is merely illustrative of the principles thereof and that numerous modifications and embodiments of the invention may be derived within the spirit and scope thereof.

What is claimed is

1. An educational device comprising a housing having a viewing surface, said viewing surface having a first pair of adjacent apertures therein disposed in a first row and a second pair of adjacent apertures therein disposed in a second row substantially parallel to said first row, said first and second rows being substantially adjacent, one aperture of said first pair of apertures being adjacent to one aperture of said second pair of apertures in a first column and the other aperture of said first pair of apertures being adjacent to said other aperture of said second pair of apertures in a second column; a substantially planar mirror surface disposed below said first pair of apertures at a predetermined angle relative to said first pair of apertures, said second pair of apertures being disposed in said viewing surface at an angle substantially equivalent to said mirror surface predetermined angle; and means removably mountable in said second pair of apertures for providing a pair of visible adjacent images at said first pair of apertures, the angle of reflection of said images with respect to said mirror surface enabling said incident images through said second pair of apertures to be visible through said first pair of apertures.

2. An educational device in accordance with claim 1 wherein said image providing means comprises a pair of multifaceted members, each member having indicia on each of the faces thereof, each of said members being individually removably mountable in one of said second pair of apertures with the face thereof containing the indicia whose image is to be visible through said corresponding aperture of said first pair of apertures directly covering said one of said second pair of apertures.

3. An educational device in accordance with claim 2 wherein said multifaceted members are cubes.

4. An educational device in accordance with claim 2 wherein said indicia on one of said multifaceted members has a predetermined relationship with respect to a corresponding indicia on the other of said multifaceted members, each face thereof having different indicia thereon.

5. An educational device in accordance with claim 1 wherein said housing further includes illuminating means for illuminating said mirror surface.

6. An educational device in accordance with claim 1 wherein said housing comprises an enclosed box, said viewing surface forming a portion thereof, said mirror surface being disposed within said box.

7. An educational device in accordance with claim 6 wherein said housing further includes illuminating means for illuminating the interior of said box.

* * * * *